United States Patent [19]
Funkhouser

[11] Patent Number: 4,911,681
[45] Date of Patent: Mar. 27, 1990

[54] CERAMIC CONVEYOR BELT CONNECTOR ROD END FIXATION

[75] Inventor: William F. Funkhouser, Mount Jackson, Va.

[73] Assignee: Ashworth Brothers, Inc., Winchester, Va.

[21] Appl. No.: 380,492

[22] Filed: Jul. 17, 1989

[51] Int. Cl.$^4$ .................... F16G 11/00; B65G 17/06
[52] U.S. Cl. .................................. 474/145; 156/137; 198/851
[58] Field of Search ................ 474/140, 145, 255; 198/836, 837, 844, 845, 848, 851, 852, 853; 156/137–144

[56] References Cited

U.S. PATENT DOCUMENTS

| | | | |
|---|---|---|---|
| 2,681,728 | 6/1954 | Boron | 198/851 |
| 2,986,387 | 5/1961 | Illing | 198/851 X |
| 3,853,526 | 10/1972 | Hochart . | |
| 3,985,224 | 10/1976 | Harvey | 198/851 |
| 4,709,807 | 12/1987 | Poerink | 198/851 X |
| 4,776,454 | 8/1987 | Momose . | |

OTHER PUBLICATIONS

Matsumoto Kinzoku Kogyo Co., Ltd.—Ceramic Conveyor Belts.

Kyocera Corporation—Ceramic Link Belt—Mar. 4, 1988.

*Primary Examiner*—Thuy M. Bui
*Attorney, Agent, or Firm*—Banner, Birch, McKie and Beckett

[57] ABSTRACT

A ceramic conveyor belt including a plurality of ceramic bars is disclosed. The bars have holes disposed through opposite ends, and are aligned to form a plurality of columns of bars. The columns are separated by ceramic spacers having corresponding holes. The aligned holes form a cross-passage through which a ceramic cross rod is disposed. An annular groove is disposed about the ends of the cross rod extending beyond the outer columns. A ceramic end tab includes a hole formed therethrough defined by a peripheral wall. A portion of the peripheral wall fits within the groove, leaving a space between the end tab and the groove on the opposite side of the end tab. A ceramic putty is disposed in the space, and hardens over a portion of the end tab, preventing radial movement of the end tab with respect to the rod, thereby preventing axial movement as well. Since the end tab is prevented from falling off the rod, the outer columns are securely held on the rods as well.

Claims, 2 Drawing Sheets

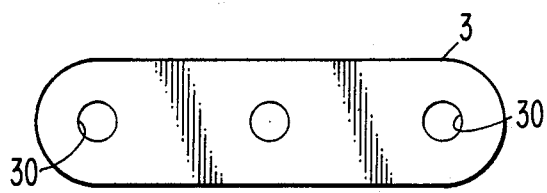
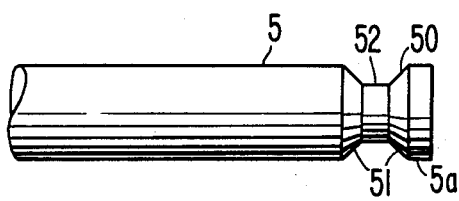
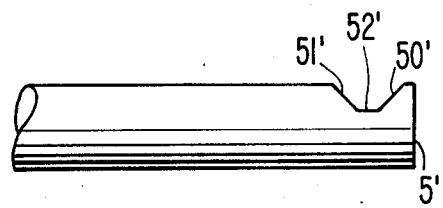
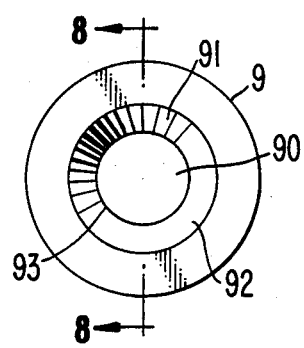
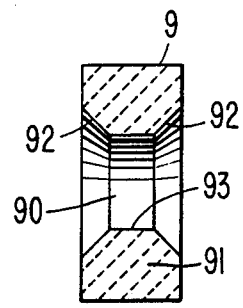
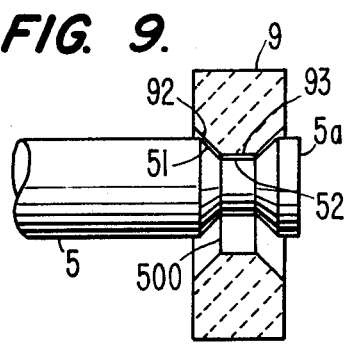
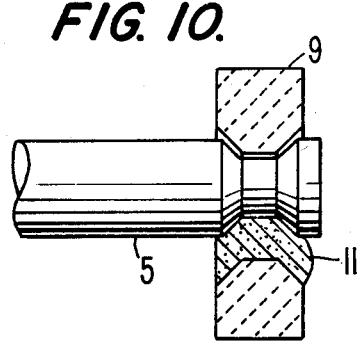
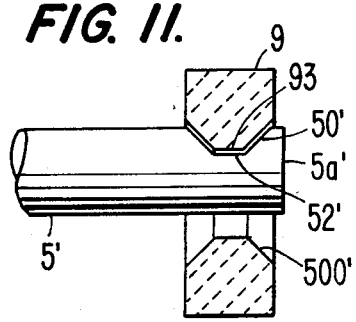
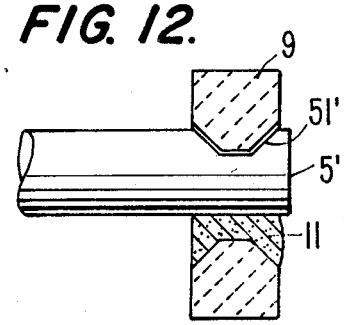

CERAMIC CONVEYOR BELT CONNECTOR ROD END FIXATION

TECHNICAL FIELD

The present invention is directed to a ceramic conveyor belt, and more particularly to an end fixation for securing the outer ceramic links of the conveyor belt on ceramic cross rods.

BACKGROUND OF THE INVENTION

Continuous ceramic conveyor belts for use in processing items which need to be subjected to extremely high temperatures are known in the art. The ceramic belts convey the articles through a high temperature environment, or through other environments which would prove chemically destructive to metal or fabric belts. Prior ceramic belts have been made either entirely of ceramic material, or only partially of ceramic material. Belts made partially of ceramic material have a limited temperature range within which they can operate, while the configuration of belts made entirely of ceramic material have been limited by manufacturing difficulties.

U.S. Pat. No. 2,986,387 to Illing discloses a ceramic belt for use in carrying tile or other types of ceramic ware through a tunnel kiln which is fired at a high temperature. The ceramic belt is formed partially of ceramic material and includes individual ceramic links interconnected by refractory metal cross rods. The ceramic links are elongated and have rounded ends with apertures extending transversely through the links at opposite rounded ends. The links are disposed in cross rows in a staggered relationship such that the forward end of one link is disposed between the adjacent rearward ends of two links disposed in the preceding row. Similarly, the rearward end of the first link is disposed between adjacent the forward ends of two other links disposed in the proceeding row. The apertures of the links are aligned to create a plurality of parallel cross-passages extending through the belt. Thus, the ceramic belt includes a plurality of columns or strips, each strip including a plurality of spaced links.

The refractory metal cross rods are disposed through the crosspassages, and have ends extending beyond the sides of the outermost links of the belt. A bore extends transversely through the rods at the extending ends. End caps are disposed on the extending ends of the rods, and include openings which are aligned with the corresponding bores in the rod. A refractory metal retaining pin is inserted in the opening and extends through the bore. An air-setting refractory cement is plugged into the opening over the end of the pin to prevent the pin from escaping from the bore after the cement matures. Insertion of the pins thereby holds the cap on the extending end to hold the ceramic belt together.

However, since the belt of Illing is made only partially of ceramic material, the temperature range in which the belt can be used is limited by the usable temperature range of the non-ceramic, refractory metal. For example, the operative temperature range of the refractory metal is disclosed in the Illing patent as 1600°–2400° F. However, current high temperature processing can occur up to 4000° F. Thus, in the disclosed structure of Illing the metal pin would be likely to melt at the desired extreme temperatures. Furthermore, in order for the refractory cement to perform the function of preventing escape of the pin, it would have to be bonded in the hole or else the cement plug would simply fall out. In practice, it is difficult to bond cement material to ceramic material and operate at the temperature range of 4000° F.

Belts made totally of ceramic material overcome the temperature limitations of partial ceramic belts. However, ceramic materials which are suitable for use at these elevated temperatures are extremely hard in the fired or usable state. Machining the components after firing to provide a conventional means of holding the belt assembly together is either impossible, or at best, extremely difficult and economically unfeasible. For example, due to the small size of the cross rods and their circular cross sections, it is extremely difficult to drill holes in the cross rods if a cotter pin mechanism is to be used.

Due to the difficulty of machining fired ceramic components, previous attempts to make ceramic conveyor belts have involved either machining an edge fixation into the components in their "green" or unfired state when the components are extremely fragile, or making a belt without a mechanism of holding the edges of the belt together. The width of a ceramic belt with components machined in the "green" state has been limited by the fragility of the "green" components which had to be of a relatively small size in order to be handled and machined without excessive breakage. Using "green" components has also resulted in large numbers of scrap pieces and has prevented the stocking of belt components or repair parts until after an order had been placed identifying the specific size of belt required. A drawback of running a belt with unconnected components is that the components may spread apart causing operational problems.

In addition to the above problems in forming end fixations on ceramic belts, reliability problems have occurred in prior ceramic belt end fixation techniques. For example, when a conventional mechanical interlock such as cotter pins or threaded nuts has been used, the pins and nuts frequently became loose after the belt was operated for a period of time. When glued or bonded components have been used, the reliability of the bond has been very limited in the high temperature range within which ceramic conveyor belts operate.

SUMMARY OF THE INVENTION

The present invention relates to an end fixation for a ceramic conveyor belt. The belt includes a plurality of ceramic bars inter-connected by ceramic rods, and the fixation holds the bars on the rods. The ceramic connector rods include indentations formed in both ends. A ceramic end tab is disposed on each end of the rod. Each ceramic end tab has a hole formed through it. The perimeter of the hole through the end tabs is defined by an integrally formed annular projection. The annular projection fits within each indentation of the rod, and space is left between the annular projection and the connector rod at a location on the surface of the rod opposite the area where the projection fits within the indentation. A soft filler material is disposed in the space to substantially completely fill the space and to extend over the annular projection. The filler material hardens in the space and prevents the radial and axial movement of the end tab with respect to the rod, preventing the end tabs from falling off of the rod and thereby preventing the bars interconnected by the rods from falling off of the ends of the rod.

In one embodiment, the indentation is formed completely around the circumferential surface of the rod to form an annular groove, and in another embodiment, the indentation is formed as a notch extending around only a portion of the circumferential surface of the rod. The filler material is preferably a ceramic putty. The filler material, when hardened, cannot fall out of the space between the rod and the end tab because it is formed over the annular projection of the end tab and fills in the space between the hole through the end tab and the rod. The hardened filler material thus prevents the end tab from moving radially or axially and thus prevents the annular projection from moving out of the indentation. This securement function is attained without requiring that the filler material bond to either the end tab or the rod. The problem of obtaining adequate bonding at the elevated temperatures at which the ceramic belt will operate is eliminated, since no bonding is required.

Additionally, the necessity of machining the components in a "green" state is eliminated as well, since a relatively simple machining operation, i.e. grinding a notch or an annular groove, can be readily done in the fired or hardened state of the rod. In contrast, the more complex machining process of threading or drilling small holes in the rod have not been previously readily obtainable in the fired state. Another advantage obtained by not requiring a bond between the attachment components is that the fixation is not adversely affected if the materials have different coefficients of expansion. Thus, in the present invention, the shrinkage of the filler material on curing more than allows for different changes in size of the pieces that would tend to break other designs requiring tight fits if the pieces expanded or shrunk at different rates or amounts.

Further objects, features and other aspects of this invention will be understood from the following detailed description of the preferred embodiments of this invention, with reference to the drawings.

BRIEF DESCRIPTION OF THE DRAWINGS

FIG. 4 is a side view of a ceramic bar used in the conveyor belt.

FIG. 5 shows a connector rod forming part of the present invention.

FIG. 6 shows another embodiment of a connector rod according to the present invention.

FIG. 7 is a side view of an end tab forming part of the present invention.

FIG. 8 is a cross-sectional view along line 8—8 shown in FIG. 7.

FIG. 9 shows the end tab of FIG. 7 in cross-section disposed on the connector rod of FIG. 5.

FIG. 10 shows the cross-sectioned end tab and connector rod of FIG. 9 including filler material disposed in the space therebetween.

FIG. 11 shows the end tab of FIG. 7 in cross-section disposed on the connector rod of FIG. 6.

FIG. 12 shows the cross-sectioned end tab and connector rod of FIG. 11 including filler material disposed in the space therebetween.

DETAILED DESCRIPTION OF THE INVENTION

Figure 1:
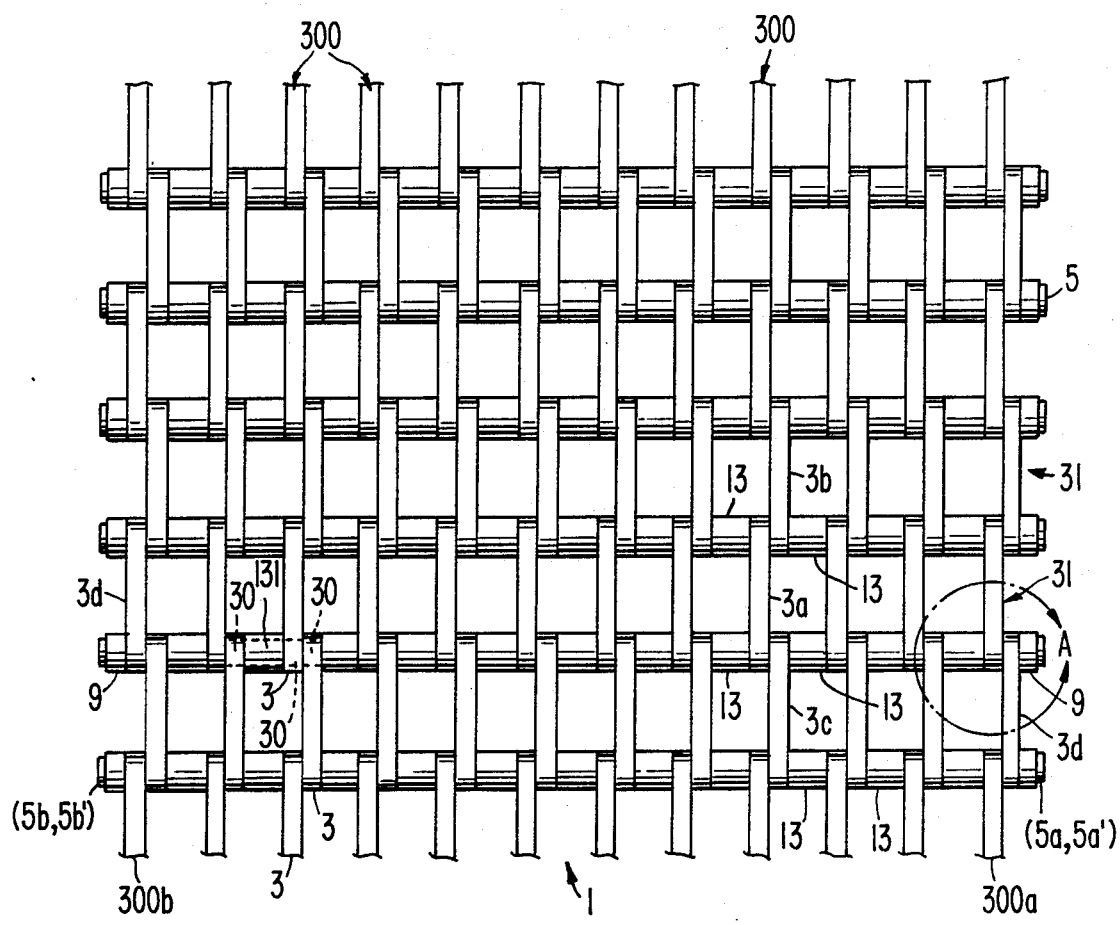
FIG. 1 is a top plan view of a portion of a ceramic conveyor belt including the connector rod end fixation of the present invention.
Figure 2:
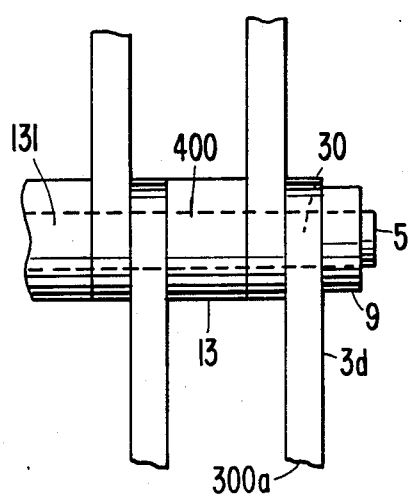
FIG. 2 is an enlarged view of a portion of the conveyor belt shown in Circle (A) in FIG. 1.
Figure 3:
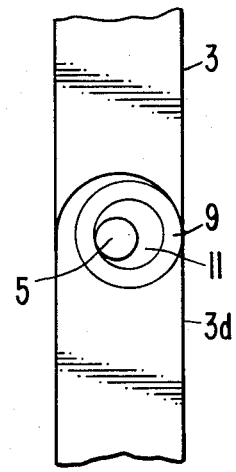
FIG. 3 is a side view of the portion shown in FIG. 2.

With reference to FIGS. 1-3, ceramic belt 1 includes a plurality of ceramic bars 3 disposed in a plurality of continuous strips or columns 300, columns 300 may be spaced from one another by ceramic spacers 13. Alternatively, spacers 13 may be eliminated and only columns 300 utilized to define the belt surface. Bars 3 and spacers 13 are connected by ceramic rods 5 and secured in position by ceramic end tabs 9. Ceramic bars 3, rods 5, spacers 13 and end tabs 9 are preferably formed of silicon carbide or other ceramic materials with a suitable resistance to thermal shock or thermal cycling, including but not limited to zirconia or silicon nitride.

Bars 3 are generally oval shaped with rounded ends. A plurality of holes 30 are formed through bars 3. As an example only, the dimensions of the bars may be: 2.75" long, 0.75" wide, and 0.25" thick. The plurality of holes 30, shown by the dashed lines in FIGS. 1 and 2, may include three holes such that a central hole is disposed equidistantly between the two end holes, that is, a forward and a rearward hole. The overall length between the two outer holes may be 2". Finally, the diameter of the holes may be 0.255".

Bars 3 are disposed in a plurality of offset rows 31 such that the bars in each row are spaced from each other. The forward end of one bar, for example, bar 3a is disposed adjacent the rearward end of bar 3b disposed in the preceding row. The forward hole of bar 3a is aligned with the rearward hole of bar 3b. Similarly, the rearward end of bar 3a is disposed adjacent the forward end of bar 3c disposed in the proceeding row, with the respective holes aligned. Bar 3c is on the same side of bar 3a as bar 3b. In this manner, continuous strip 300 of staggered bars 3 is created.

The ceramic belt is comprised of a plurality of strips 300 which are separated by ceramic spacers 13 disposed adjacent the forward and rearward ends of each bar 3, for example bar 3a, on the side opposite from bars 3b and 3c. Holes 131 are formed through ceramic spacers 13 and are aligned with the holes through bars 3, such that a plurality of continuous cross-channels 400 are created as shown in FIG. 2. As an example only, the dimensions of spacers 13 may be 0.75" in outer diameter and 0.255" in inner diameter, that is, the diameter of hole 131. The thickness of spacers 13 may be 0.25", 0.375" or 0.5". Although the spacers are shown as having a circular exterior cross section, any suitable shape may be used.

With reference to FIGS. 1, 2 and 5, ceramic rods 5 have circular cross-sections and are disposed through cross channels 400 created by the adjacent holes of bars 3 and spacers 13. Each rod 5 includes ends 5a and 5b which extend beyond outermost columns 300a and 300b of bars 3 of the ceramic belt, that is, on the outer side of outermost bars 3d. Annular groove 50 is formed in ends 5a and 5b of rods 5. Groove 50 is formed by inwardly inclined peripheral surfaces 51 and integral bottom horizontal surface 52 disposed generally in parallel to the central axis of rod 50.

With reference to FIGS. 7 and 8, a ceramic end tab 9 is illustrated. End tab 9 is generally circular and includes a hole 90 extending through it. The perimeter of hole 90 is formed by integral annular projection 91 extending from the inner surface of end tab 9. Projection 91 is formed by inclined peripheral walls 92, and integral connecting surface 93 which is generally parallel to the central axis of end tab 9. The shape of annular projection 91 generally corresponds with the shape of annular groove 50 formed in rod 5. As an example only, the dimensions of end tab 9 may be: 0.625" in outer diameter, 0.375" in diameter measured between opposing bases of peripheral wall 92, and 0.255" in diameter measured between opposing faces of horizontal surface 93, that is, the diameter of hole 90. The width of surface 93 may be 0.0625" and the overall thickness of the end tab may be 0.25". The inner diameter of end tab 9, that is, the diameter of hole 90, is generally slightly greater than the overall cross-sectional diameter of rod 5, and is substantially greater than the diameter of rod 5 at the location of bottom horizontal surface 52 of groove 50.

With reference to FIGS. 1 and 2, it is seen that end tabs 9 are disposed over ends 5a and 5b of rod 5, adjacent and outside of outermost bars 3d. Details of the connection of an end tab 9 to one end of a rod 5 are shown in FIGS. 9 and 10. As seen therein, annular projection 91 fits securely within the circumferential surface of groove 50, with connecting surface 93 resting on surface 52. The lower part of annular projection 91 is disposed below the lower surface of bottom horizontal surface 52, such that space 500 is left between rod 5 and end tab 9. Soft filler material 11, for example, a ceramic putty in the non-hardened state, is disposed in space 500, completely filling space 500 and extending over peripheral walls 92 of annular projection 91. Suitable ceramic putties include a zirconia based liquid cement filled with a silicon carbide based dry refractory cement to obtain the desired consistency, or a castable ceramic compound. For example, AREMCO ULTRATEMP 516® filled with CARBOFRAX #90®, or CERAMACAST 646®, could be used. Ceramic putty 11 hardens in place within space 500.

Since putty 11 is disposed between rod 5 and end tab 9, over peripheral walls 92, after hardening putty 11 is prevented from moving either axially or radially with respect to either end tab 9 or rod 5. Thus, ceramic putty 11 is securely held within space 500 and radial movement of end tab 9 with respect to rod 5 is completely prevented such that the upper part of peripheral walls 92 cannot be raised out of groove 50. Since end tab 9 cannot be moved radially, and since the upper surfaces of peripheral walls 92 are disposed within groove 50, end tab 9 is secured against axial movement and is prevented from falling off of the end of rod 5. Thus, end tab 9 securely retains outermost bars 3d on rods 5 such that outermost bars 3d may not fall off, thereby securely holding each of the outermost columns 300a and 300b on rods 5.

With reference to FIGS. 6, 7, 11 and 12, a second embodiment of the invention is shown. Notch 50' is formed at each extending end 5a' and 5b' in the upper circumferential side of each rod 5' and extends around only a portion of the perimeter of the rod. Notch 50' is formed by inwardly inclined peripheral surfaces 51' and integral bottom horizontal surface 52'. An end tab 9 is disposed over each end 5a' and 5b' of rod 5', adjacent and outside of outermost bars 3d, such that annular projection 91 fits securely within notch 50', with connecting surface 93 resting on surface 52'. The lower part of annular projection 91 is disposed below the lower outer circumferential surface of rod 5, opposite notch 50', such that space 500' is left between rod 5' and end tab 9. Ceramic putty 11 is inserted as in the first embodiment and hardens to secure end tab 9 on rod 5' to prevent bars 3 from falling off rod 5'.

Since no holes need be drilled in rods 5', the rods may be economically ground in the fired or hardened state and are not limited in length. Thus, the width of the ceramic belt is not limited and wide belts capable of withstanding temperatures of over 4000° F. may be economically manufactured. Additionally, since hardened ceramic putty 11 is held in place due to the interfitting of peripheral walls 92 in groove 50 on the top side, or in notch 50', and the positioning of putty 11 over walls 92 on the bottom side, there is no need to develop a putty which will bond to the ceramic material. Finally, the shrinkage of the putty on curing more than compensates for the use of different ceramic materials which expand or shrink at different rates. Thus breakage is prevented and there is no adverse effect from using materials having different coefficients of expansion.

This invention has been described in detail with respect to the preferred embodiments. These embodiments are merely for example only and the invention is not limited thereto. It will be understood by those skilled in the art that other variations and modifications can easily be made within the scope of this invention as defined by the appended claims.

I claim:

1. An end fixation in a ceramic conveyor belt comprising a plurality of ceramic bars interconnected by ceramic rods, said fixation holding the bars on the rods and comprising:
   a ceramic connector rod including an indentation formed in both ends of said rod;
   a plurality of ceramic end tabs each including a hole formed through it, the perimeter of said hole of said end tabs defined by an integrally formed annular projection, one said end tab disposed on each end of said rod such that said annular projection fits within each said indentation and a space is left between said projection and said connector rod at a location on the surface of said rod opposite where said projection fits within said indentation;
   and a filler material disposed in said space when in a soft state to substantially completely fill said space and to extend over said annular projection, said filler material hardening in said space and preventing radial and axial movement of said end tab with respect to said rod, to thereby prevent the bars interconnected by said rods from falling off of the ends of said rod.

2. The end fixation recited in claim 1, said annular projection of said end tabs having a cross-sectional shape generally corresponding to the cross-sectional shape of said indentations of said rods.

3. The end fixation recited in claim 1 or 2, said indentations extending completely around the circumferential surface of said rod to form annular grooves therein.

4. The end fixation recited in claim 1 or 2, said indentations formed as a notch extending around only a portion of the circumferential surface of said rod.

5. The end fixation recited in claim 1 or 2, said filler material comprising a ceramic putty.

6. The end fixation recited in claim 5, said annular projection comprising inclined peripheral walls and a connecting surface extending between and integrally formed with said peripheral walls, said hardened ceramic putty disposed over said peripheral walls.

7. The end fixation recited in claim 6, said indentations having inclined peripheral surfaces and an integrally formed bottom surface disposed essentially in parallel to the longitudinal axis of said rod, said connecting surface of said end tab resting on said bottom surface at the location where said projection fits within said indentation.

8. A ceramic conveyor belt comprising:
a plurality of ceramic bars including at least a forward hole and a rearward hole disposed therethrough in opposite ends of said bars, said bars disposed in offset rows such that the forward end of a first bar is disposed adjacent the rearward end of a preceding bar with the forward hole of said first bar aligned with the rearward hole of the preceding bar, and the rearward end of said first bar is disposed adjacent the forward end of a proceeding bar with the rearward hole of said first bar aligned with the forward hole of said proceeding bar to thereby form a column of bars, said belt comprising a plurality of columns of bars and said aligned holes creating a plurality of crosschannels through said columns;
a plurality of ceramic connector rods, one said rod disposed through each said cross-channel and having ends extending beyond the outermost of said columns on either side of said belt, said rods including an indentation formed in each said extending end thereof;
a plurality of ceramic end tabs each including a circular hole formed through it, the perimeter of said hole defined by an integrally formed annular projection, one said end tab disposed on each extending end of each said rod such that said annular projection fits within each said indentation and a space is left between said projection and said connector rod at a location on the surface of said rod opposite the location where said projection fits within said indentations;
and a filler material disposed in said space when in a soft state to substantially completely fill said space and to extend over said annular projection, said filler material hardening in said space and preventing radial and axial movement of said end tab with respect to said rod without bonding to said rod or to said end tab, to thereby prevent said bars from falling off of said rod.

9. The conveyor belt recited in claim 8, said annular projection of said end tabs having a cross-sectional shape generally corresponding to the shape of said indentations of said rods.

10. The conveyor belt recited in claim 8 or 9, said indentations extending completely around the circumferential surface of said rod to form annular grooves therein.

11. The conveyor belt recited in claim 10, said annular projection comprising inclined peripheral walls and a connecting surface integrally formed with said peripheral walls, said hardened ceramic putty disposed over said peripheral walls.

12. The conveyor belt recited in claim 11, said annular grooves having inclined peripheral surfaces and an integrally formed bottom surface disposed essentially in parallel to the longitudinal axis of said rod, said connecting surface of said end tab resting on said bottom surface at the location where said projection fits within said annular groove.

13. The conveyor belt recited in claim 8 or 9, said filler material comprising a ceramic putty.

14. The conveyor belt recited in claim 8 or 9 further comprising ceramic spacers disposed between said columns of bars, said spacers having holes extending therethrough which are aligned with the holes in said bars to form part of said cross-channels.

15. The conveyor belt recited in claim 8 or 9, said indentations formed as a notch extending around only a portion of the circumferential surface of said rod.

16. A method for securing the ends of a ceramic conveyor belt, the conveyor belt including a plurality of ceramic bars having holes formed through its opposite ends, rods extending through the holes in the bars and having ends extending beyond outermost bars on each side of the belt, said method including the steps of:
forming an indentation in said extending ends of the ceramic rods;
disposing a ceramic end tab having a hole formed through it on the rod at the location of the indentations, said hole of said end tab having a larger diameter than the rod at the location of said indentations such that a space is left between the inner surface of said end tab and the outer surface of the rod at a location opposite where said end tab is placed into said indentation;
disposing a hardenable filler material in said space, said filler material hardening over said end tab and in said space to secure said end tab on the rod to thereby prevent the outermost bars of said ceramic belt from falling off of said rods. holes in the bars and having ends extending beyond outermost bars on each side of the belt, said method including the steps of:
forming an indentation in said extending ends of the ceramic rods;
disposing a ceramic end tab having a hole formed through it on the rod at the location of the indentations, said hole of said end tab having a larger diameter than the rod at the location of said indentations such that a space is left between the inner surface of said end tab and the outer surface of the rod at a location opposite where said end tab is placed into said indentation;
- disposing a hardenable filler material in said space, said filler material hardening over said end tab and in said space to secure said end tab on the rod to thereby prevent the outermost bars of said ceramic belt from falling off of said rods.

17. The method recited in claim 16, said indentations machined to extend completely around the circumferential surface of the rod to form annular grooves therein.

18. The method recited in claim 16, said indentations machined around only a portion of the circumferential surface of the rod to form a notch therein.

19. The method recited in claim 16, said filler material comprising a ceramic putty.

20. The method recited in claim 19, said end tabs having an annular projection comprising inclined peripheral walls and a connecting surface integrally formed with said peripheral walls, said hardenable ceramic putty disposed over said peripheral walls in said space.

21. The method recited in claim 20, said annular groove having peripheral surfaces and an integrally formed bottom surface disposed essentially in parallel to the longitudinal axis of said rod, said connecting surface of said end tab resting on said bottom surface at the location where said end tab is placed into said indentation.

* * * * *

UNITED STATES PATENT AND TRADEMARK OFFICE
CERTIFICATE OF CORRECTION

PATENT NO. : 4,911,681

DATED : March 27, 1990

INVENTOR(S) : William F. Funkhouser

It is certified that error appears in the above-identified patent and that said Letters Patent is hereby corrected as shown below:

Claim 16, Column 8, line 28, after "belt from falling off of said rods." delete the remainder of the claim.

Signed and Sealed this

Twenty-sixth Day of March, 1991

Attest:

HARRY F. MANBECK, JR.

Attesting Officer

Commissioner of Patents and Trademarks